(12) United States Patent
Nowotka et al.

(10) Patent No.: US 10,508,704 B2
(45) Date of Patent: Dec. 17, 2019

(54) AIR SPRING FOR A MOTOR VEHICLE

(71) Applicant: ZF FRIEDRICHSHAFEN AG, Friedrichshafen (DE)

(72) Inventors: Thomas Nowotka, Theres (DE); Alfred Memmel, Schonungen (DE); Georg Memmel, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/757,236

(22) PCT Filed: Aug. 1, 2016

(86) PCT No.: PCT/EP2016/068273
§ 371 (c)(1),
(2) Date: Mar. 2, 2018

(87) PCT Pub. No.: WO2017/036697
PCT Pub. Date: Mar. 9, 2017

(65) Prior Publication Data
US 2018/0216689 A1    Aug. 2, 2018

(30) Foreign Application Priority Data

Sep. 4, 2015  (DE) .......................... 10 2015 216 956

(51) Int. Cl.
*F16F 9/05*  (2006.01)
*F16F 9/32*  (2006.01)
(Continued)

(52) U.S. Cl.
CPC ............ *F16F 9/057* (2013.01); *B60G 17/019* (2013.01); *F16F 9/05* (2013.01); *F16F 9/3292* (2013.01);
(Continued)

(58) Field of Classification Search
CPC ...... F16F 9/05; F16F 9/057; F16F 9/44; F16F 9/3292; F16F 2230/0052; F16F 2230/08;
(Continued)

(56) References Cited

U.S. PATENT DOCUMENTS 4,310,172 A * 1/1982 Claude ............. B60G 17/01933
                                              280/6.158
4,506,751 A * 3/1985 Stephens ............. B62D 33/071
                                              180/89.15
(Continued)

FOREIGN PATENT DOCUMENTS

DE    60 2004 002 668    8/2007
DE    10 2011 107 970    1/2013
(Continued)

*Primary Examiner* — Thomas J Williams
(74) *Attorney, Agent, or Firm* — Cozen O'Connor

(57) ABSTRACT

An air spring for a motor vehicle having a rolling bellows filled with gas under pressure, one end of the rolling bellows is connected to a load receiver and the other end is fastened to a roll-off piston'. The load receiver and the roll-off piston are moveable relative to one another depending on a force impinging on the load receiver toward the roll-off piston. A sensor device is arranged inside the rolling bellows by which a distance between the load receiver and the roll-off piston is detected. A pressure piece extending in direction of the roll-off piston is arranged at the load receiver and a sensor body is movably drivable along a sensor track of the sensor device by an end region of the pressure piece facing the roll-off piston. The sensor device generates an electric signal corresponding to the position of the sensor body on the sensor track.

15 Claims, 9 Drawing Sheets

(51) Int. Cl.
*B60G 17/019* (2006.01)
*B60G 11/27* (2006.01)
*B60G 17/052* (2006.01)
*F16F 9/36* (2006.01)

(52) U.S. Cl.
CPC .......... *B60G 11/27* (2013.01); *B60G 17/0521* (2013.01); *B60G 2202/152* (2013.01); *B60G 2204/111* (2013.01); *B60G 2400/252* (2013.01); *F16F 9/361* (2013.01); *F16F 2230/0052* (2013.01); *F16F 2230/08* (2013.01); *F16F 2232/06* (2013.01)

(58) Field of Classification Search
CPC ............... F16F 2232/06; B60G 17/019; B60G 17/0521; B60G 17/01933; B60G 2202/152; B60G 2204/111
See application file for complete search history.

(56) References Cited

U.S. PATENT DOCUMENTS

| | | | | |
|---|---|---|---|---|
| 4,802,657 A | * | 2/1989 | Wijnhoven | B60G 17/01933 188/1.11 E |
| 4,902,903 A | * | 2/1990 | Segerson | B60G 17/01933 250/229 |
| 4,909,536 A | * | 3/1990 | Hale | B60G 17/01933 180/41 |
| 4,989,844 A | * | 2/1991 | Wijnhoven | B60G 17/01933 267/64.24 |
| 5,135,203 A | * | 8/1992 | Wijnhoven | B60G 17/01933 267/64.21 |
| 5,859,692 A | | 1/1999 | Ross et al. | |
| 7,150,450 B2 | * | 12/2006 | Bell | B60G 11/27 267/64.21 |
| 2007/0052141 A1 | | 3/2007 | Li | |

FOREIGN PATENT DOCUMENTS

| | | |
|---|---|---|
| DE | 10 2013 106 703 | 12/2014 |
| FR | 2 612 589 | 9/1988 |
| JP | S58 161609 | 9/1983 |
| JP | S58 193402 | 11/1983 |

* cited by examiner

AIR SPRING FOR A MOTOR VEHICLE

CROSS REFERENCE TO RELATED APPLICATIONS

This is a U.S. national stage of application No. PCT/EP2016/068273, filed on Aug. 1, 2016. Priority is claimed on German Application No. DE102015216956.1, filed Sep. 4, 2015, the content of which is incorporated here by reference.

BACKGROUND OF THE INVENTION

1. Field of the Invention

The invention is directed to a rolling bellows filled with gas under pressure, one end of the rolling bellows is connected to a cap-like load receiver and the other end of the rolling bellows is fastened to a roll-off piston. The load receiver and the roll-off piston are moveable relative to one another depending on a force impinging on the load receiver toward the roll-off piston. A sensor device is arranged inside the rolling bellows by which the distance between the load receiver and the roll-off piston can be detected and a corresponding electric signal can be generated.

2. Description of the Prior Art

Air springs of this type are used inter alia for the cab suspension of a motor vehicle and are exposed to substantial forces through the movements of the driver's cab during driving operation.

SUMMARY OF THE INVENTION

It is an object of one aspect of the invention to provide an air spring for a motor vehicle of the type mentioned above that has an economical and simple construction with a low susceptibility to defects, particularly due to the driving operating forces acting on it.

According to one aspect of the invention a pressure piece extending in direction of the roll-off piston is arranged at the load receiver, and a sensor body is movably drivable directly or indirectly along a sensor track of the sensor device by the end region of the pressure piece facing the roll-off piston, wherein the sensor device generates an electric signal corresponding to the position of the sensor body on the sensor track.

This configuration has a substantially simple mechanical construction that is extensively unsusceptible to driving operation forces acting upon it. Therefore, it is substantially unsusceptible to defects.

The fact that the sensor device is arranged inside the rolling bellows and is accordingly protected against external influences such as dirt and moisture further contributes to the lack of susceptibility to defects.

Depending on the existing installation space, the sensor track can be a linearly extending sensor track or circularly extending sensor track.

In principle, any suitable sensor can be used for the sensor device.

In order to prevent mechanical wear, the sensor device is preferably a contactless sensor device.

The sensor device can advantageously be a magnetic inductive sensor device.

To this end, the sensor body can have one or more LC circuits and the sensor track can have two conductor paths, one of which conductor paths extends along the sensor track in a sine-shaped manner and the other conductor path extends along the sensor track in a cosine-shaped manner.

In order to convert the translational movement to be detected into a rotational movement, the pressure piece in one embodiment form can be fixed with respect to rotation and can have at its end area facing the roll-off piston a lock with a lock aperture extending axially to the pressure piece, an axially stationary shaft of the same cross section which is supported so as to be rotatable around a rotational axis and which has a helical thread extending over the length of the shaft projects into the lock aperture, and the sensor body is movably drivable along the circular sensor track from the end of the shaft remote of the pressure piece.

In this way, the required installation space for the sensor device can be minimized.

The sensor track can be arranged concentric to the rotational axis of the shaft on a sensor track support, and the sensor body can be arranged at the end of the shaft remote of the pressure piece.

To allow the sensor track to be positioned at a location remote of the pressure piece and/or for stepping up or stepping down the pressure piece movement, the sensor body can also be movably drivable along the circular sensor track via a gear unit from the end of the shaft remote of the pressure piece.

If the gear unit is an angular gear unit and the sensor body is swivelable around a swiveling axis which, is inclined at an angle to the rotational axis of the shaft, the sensor track can be arranged lateral to the pressure piece so that the construction length of the air spring is reduced.

In this regard, a reliable transmission of movement is carried out in that the gear unit is a toothed-wheel transmission.

In order to prevent measuring errors due to backlash in the toothed-wheel transmission, the output gear of the toothed-wheel transmission can be acted upon in a rotational direction by a spring force that is smaller than the force required for the rotational drive of the toothed-wheel transmission.

The signal generated by the sensor device can be used for diverse adjustments and controls for which information about the distance between the load receiver and the roll-off piston is required.

The electric signal can preferably be fed to control electronics, and an inlet valve and/or outlet valve to the interior of the rolling bellows can be controlled by the control electronics so that a constant distance can be adjusted between the load receiver and the roll-off piston independently from the loading of the load receiver.

This is particularly advantageous when the air spring is a component part of a driver's cab bearing in a motor vehicle so that the driver's cab is kept in a steady position to a great extent regardless of movements during the driving operation of the motor vehicle.

BRIEF DESCRIPTION OF THE DRAWINGS

Embodiment examples of the invention are shown in the drawing and are described more fully in the following. The drawings show.

DETAILED DESCRIPTION OF THE PRESENTLY PREFERRED EMBODIMENTS

Figure 1:
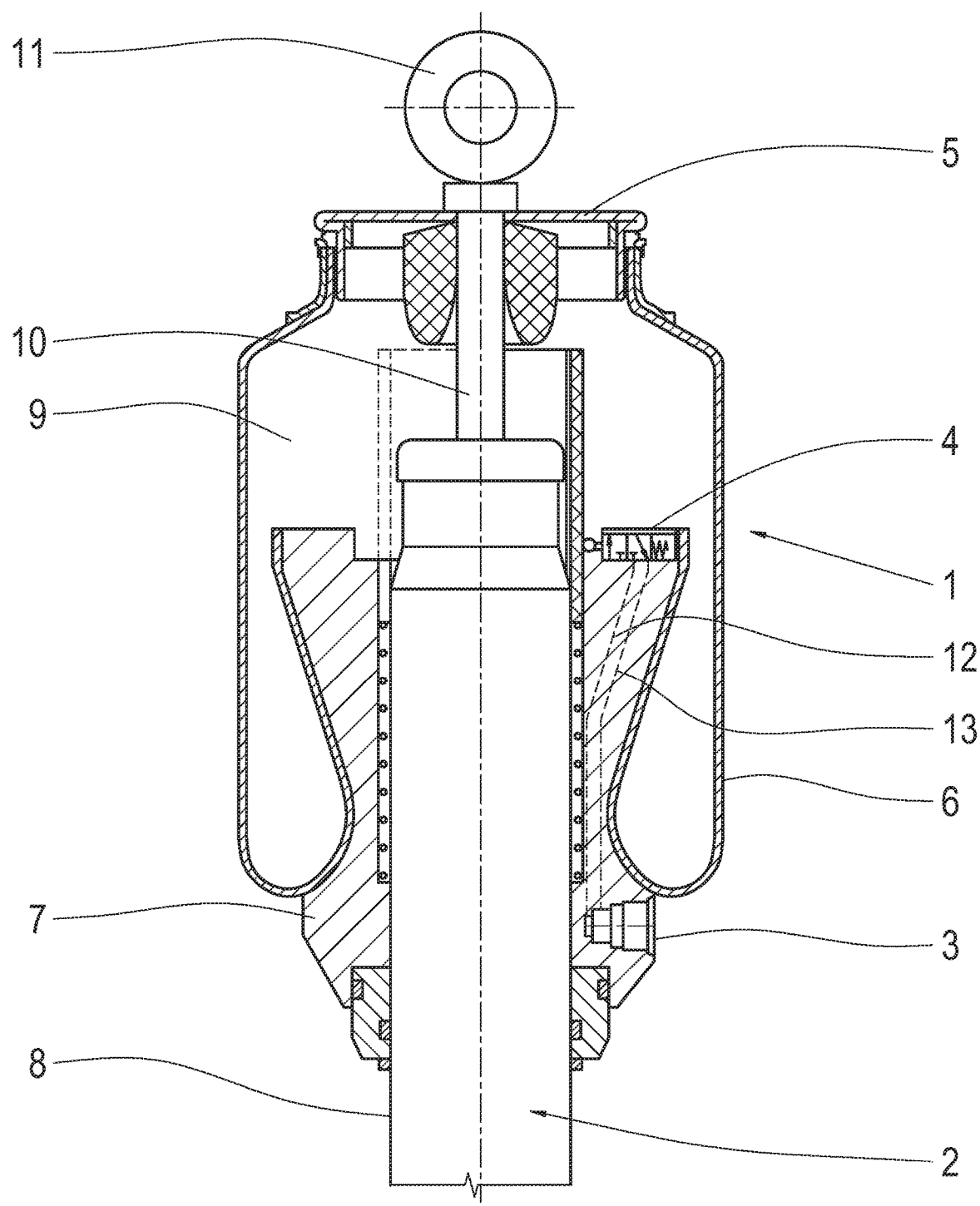
FIG. 1 is an air spring unit with a vibration damper and an air spring without sensor device, in longitudinal section.
Figure 2:
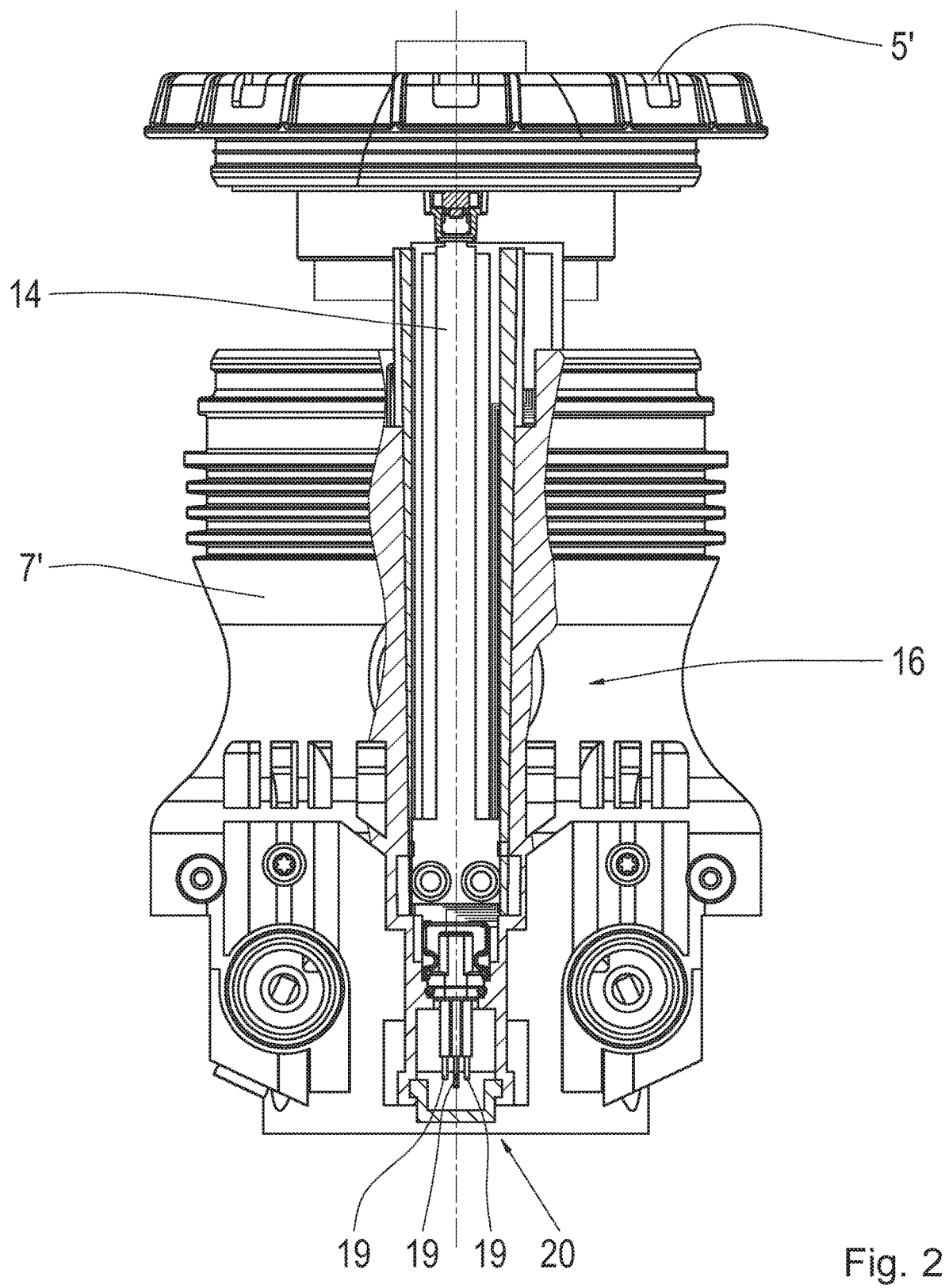
FIG. 2 is a side view of a first embodiment example of a roll-off piston, load receiver and sensor device of an air spring corresponding to FIG. 1.
Figure 3:
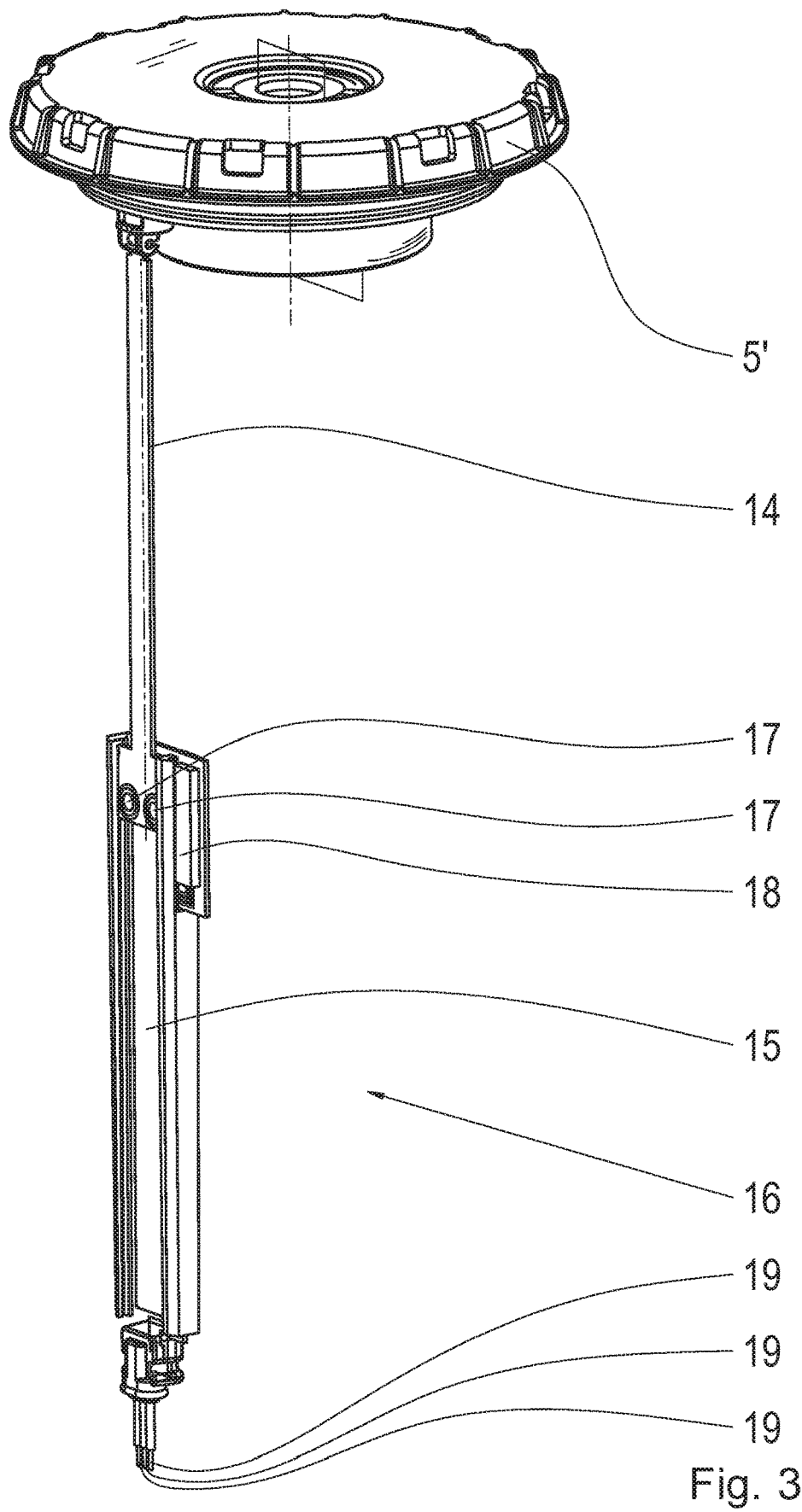
FIG. 3 is a perspective view of load receiver and sensor device according to FIG. 2.
Figure 4:
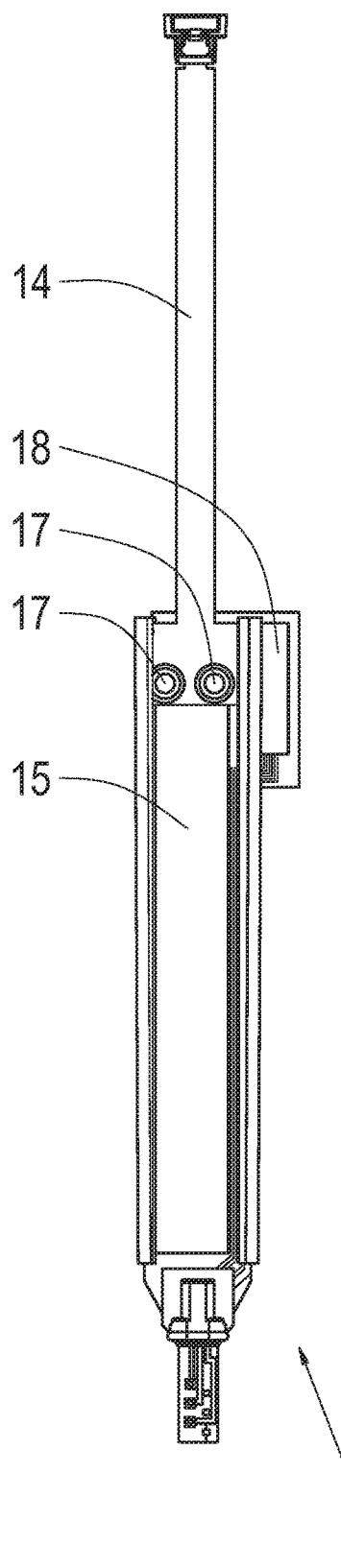
FIG. 4 is a front view of the sensor device according to FIG. 2 in the maximum extended position.
Figure 5:
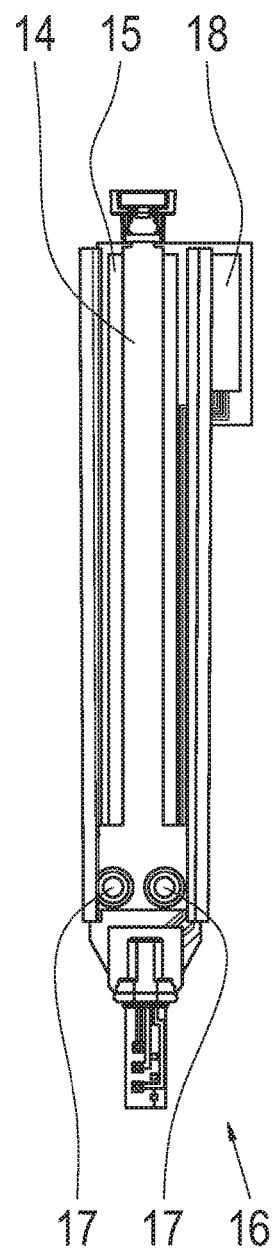
FIG. 5 is a front view of the sensor device according to FIG. 2 in maximum retracted position.
Figure 6:
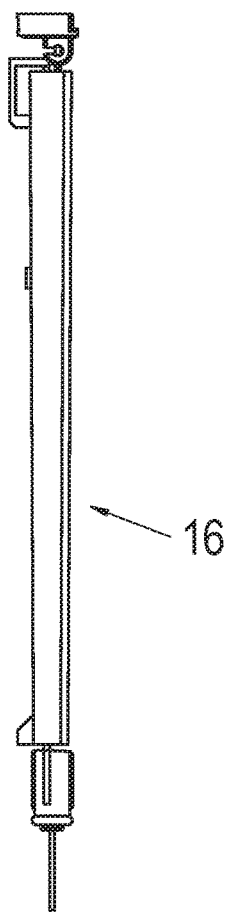
FIG. 6 is a side view of the sensor device according to FIG. 2 in maximum retracted position.

The air spring unit in FIG. 1 comprises an air spring 1 and a vibration damper 2 arranged concentric to the air spring 1. The air spring 1 is connected to a pressure source, not shown, via a supply connection 3 with the intermediary of a control valve 4.

The air spring 1 has a cap-like load receiver 5 to which the one end of a rolling bellows 6 is fastened, while the other end of the rolling bellows 6 is fastened to a roll-off piston 7.

The roll-off piston 7 has a continuous, concentric recess into which a receptacle tube 8 of the vibration damper 2 is tightly inserted.

The interior 9 of the rolling bellows 6 is filled with a gas under pressure.

A piston rod 10 of the vibration damper 2 projects through the interior 9 of the rolling bellows 6 and is supportively connected to the load receiver by its free end area. The free end of the piston rod 10 protrudes from the interior 9 and has a fastening element 11.

The control valve 4 is fastened to the roll-off piston 7 in the interior 9 of the rolling bellows 6. A compressed-air supply line 12 and a discharge line 13 are formed in the roll-off piston 7 between the control valve 4 and the supply connection 3.

The examples of sensor devices 16, 16', 16" shown in FIGS. 2 to 11 are provided to be arranged between the load receiver 5, 5' and the roll-off piston 7, 7', 7".

The first embodiment example depicted in FIGS. 2 to 6 shows a pressure piece 14 which is fastened by its one end to a load receiver 5', extends toward a roll-off piston 7' and is displaceably guided linearly toward roll-off piston 7' in a sensor track 15 of a sensor device 16, which sensor track 15 is fastened to the roll-off piston 7' and is directed toward load receiver 5'.

The sensor device 16 is a magnetic inductive sensor device and has two LC circuits 17 adjacent to one another at the end region of the pressure piece 14 facing the roll-off piston 7'. During a relative movement of the load receiver 5' and roll-off piston 7', the two LC circuits 17 are moveable along two conductor paths, not shown, which are arranged on the sensor track 15. One conductor path extends along the sensor track 15 in a sine-shaped manner, and the other conductor path extends along the sensor track 15 in a cosine-shaped manner.

The position of the LC circuits 17 on the sensor track 15 is evaluated in evaluating electronics 18, from which corresponding electric signals are supplied to plug pins 19 of a contact plug socket 20.

Figure 7:
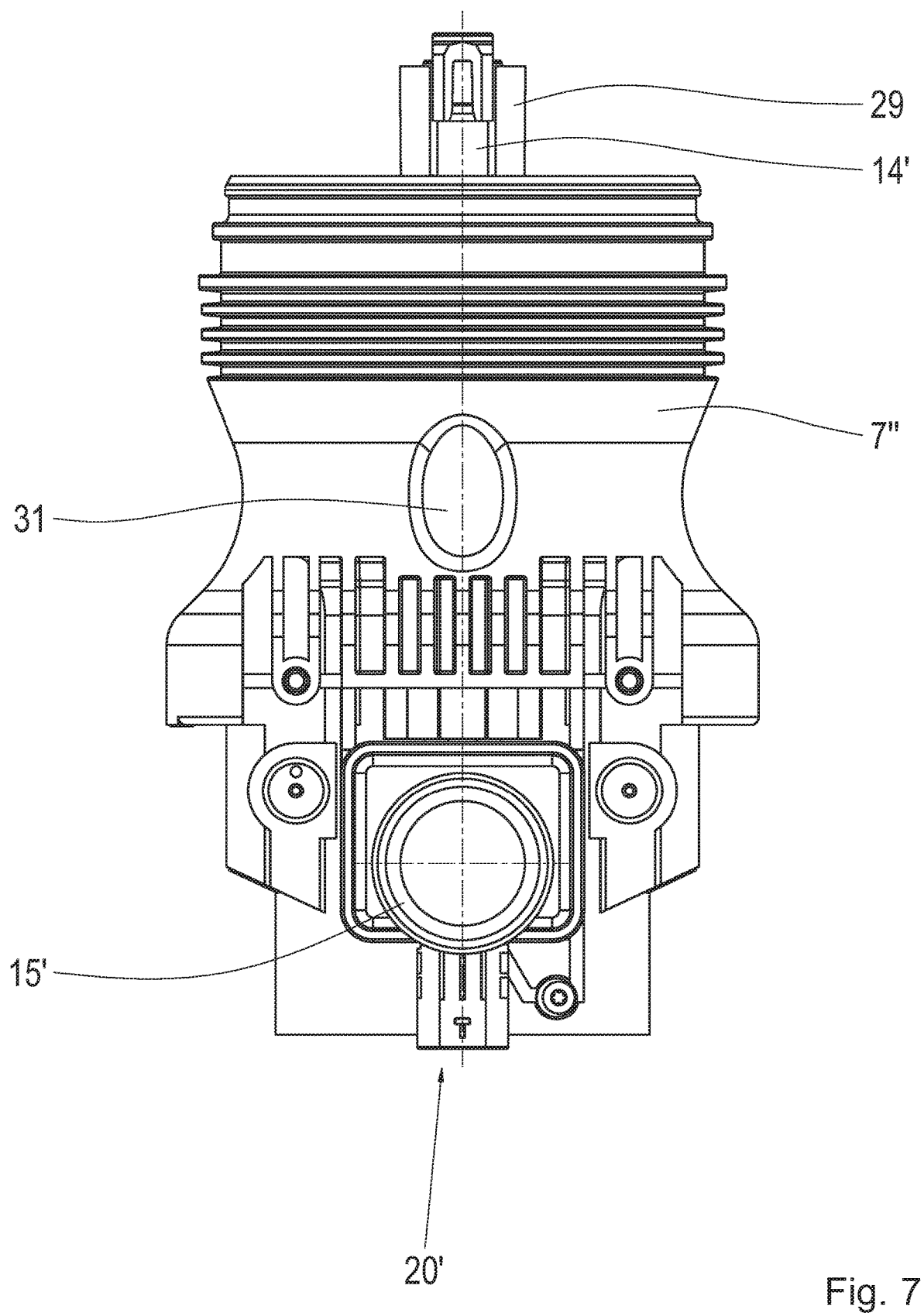
FIG. 7 is a side view of a roll-off piston and sensor device with sensor of an air spring.
Figure 8:
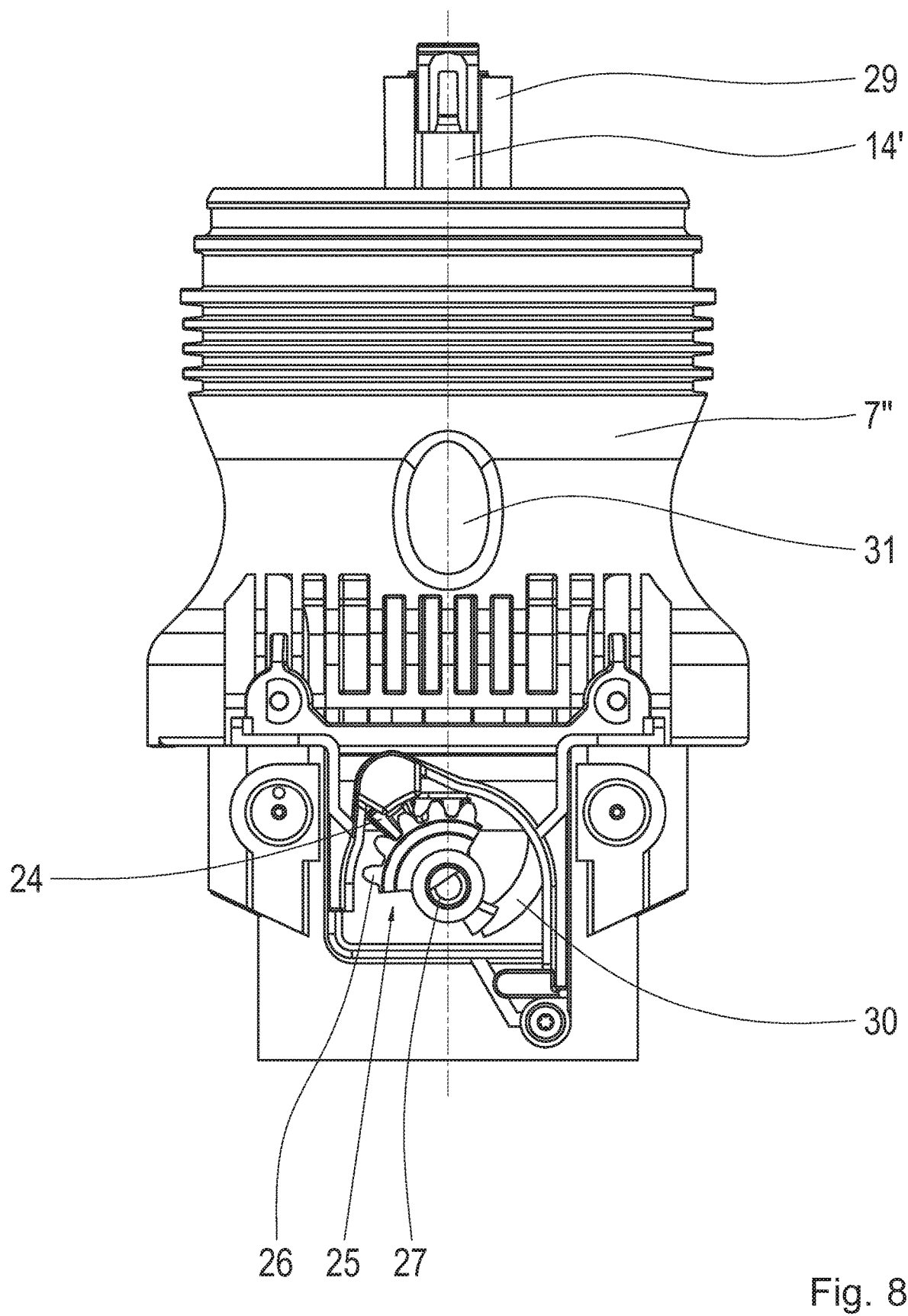
FIG. 8 is a side view of the example according to FIG. 7 of roll-off piston and sensor device with toothed-wheel transmission of the sensor device of an air spring.
Figure 9:
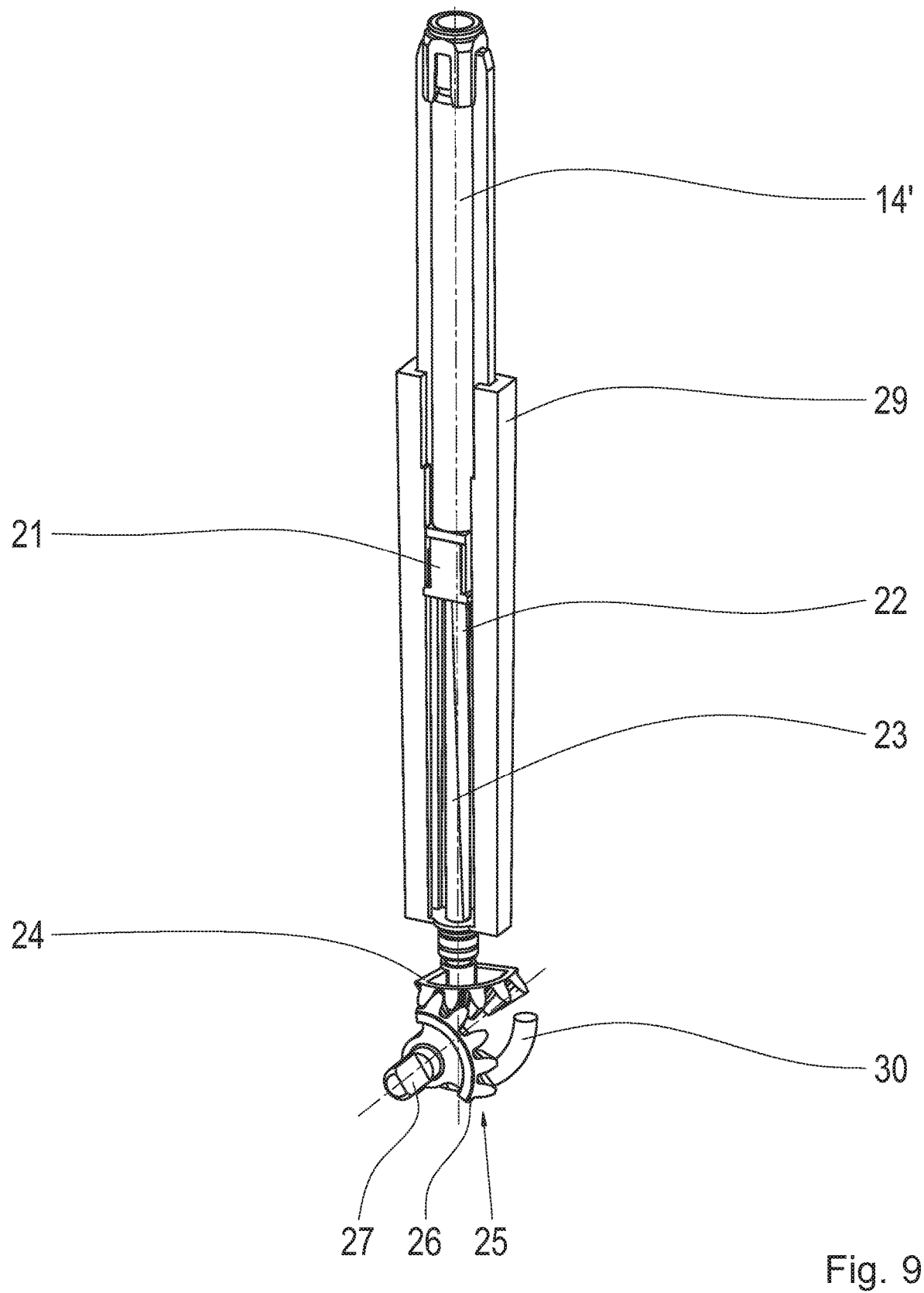
FIG. 9 is a perspective view of the sensor device according to FIG. 7 with toothed-wheel transmission of the sensor device.
Figure 10:
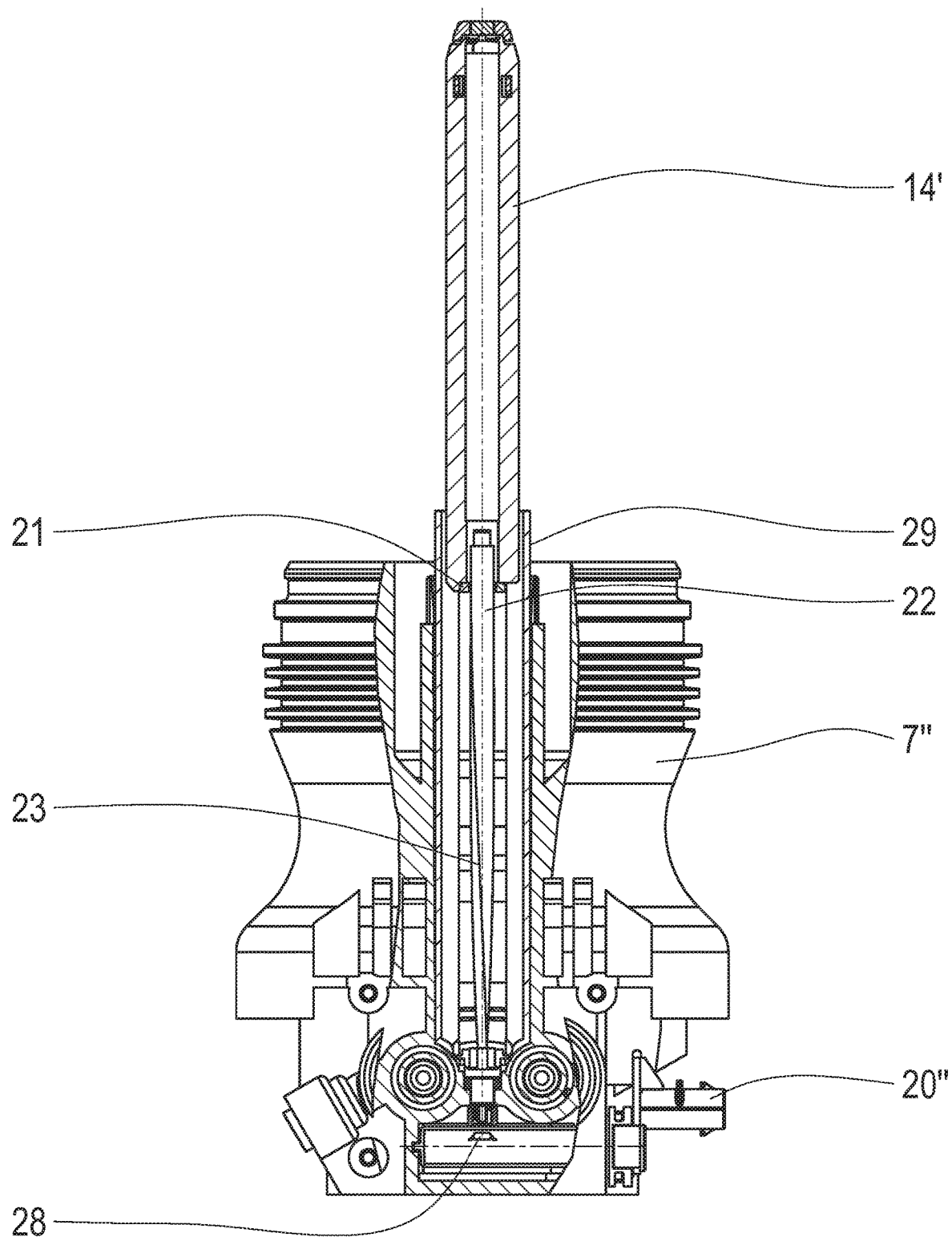
FIG. 10 is a side view with partial section of a roll-off piston and sensor device of an air spring corresponding to FIG. 1.
Figure 11:
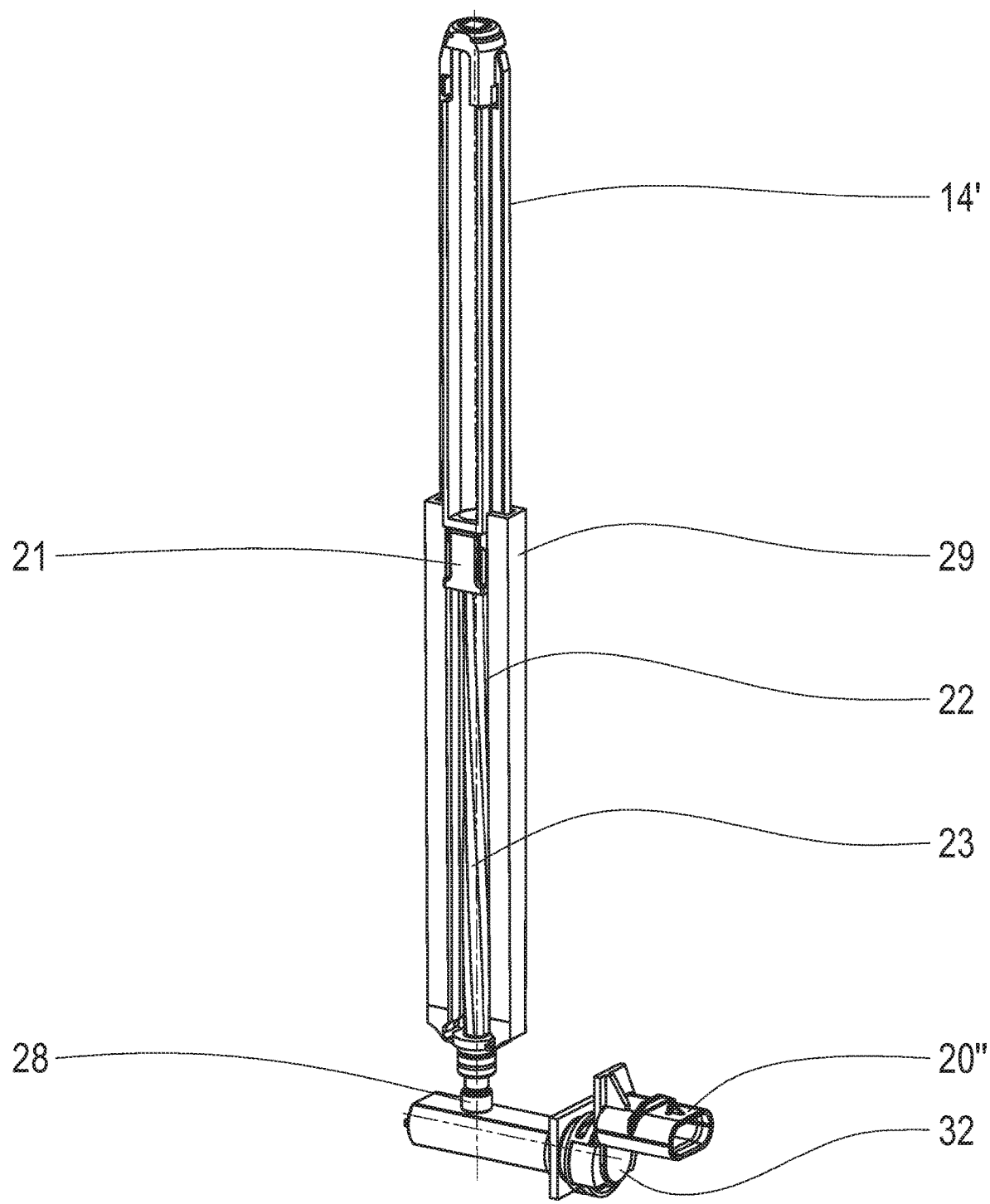
FIG. 11 is a perspective view of the sensor device of an air spring corresponding to FIG. 1.

A second embodiment example of a sensor device 16' is shown in FIGS. 7 to 9, and a third embodiment example of a sensor device 16" is shown in FIGS. 10 and 11.

A pressure piece 14' is provided in the sensor devices 16' and 16". The pressure piece 14' can be fastened to a load receiver, not shown, so as to be fixed with respect to rotation at its one end and extends toward a roll-off piston 7". The pressure piece 14' is displaceably guided linearly toward the roll-off piston 7" in a guide 29 of the sensor devices 16' and 16" fastened to the roll-off piston 7" and directed toward the load receiver.

A lock 21 with a lock aperture which extends axially to the pressure piece is arranged at the end region of the pressure piece 14' facing the roll-off piston. A shaft 22 of the same cross section which is rotatably supported at the roll-off piston 7" and which has a helical thread 23 protrudes into the lock aperture. The helical thread 23 extends along the length of the shaft 22.

A relative movement of load receiver and roll-off piston 7" causes the shaft 22 to execute a rotational movement around its longitudinal axis.

In the embodiment example of the sensor device 16' which is shown in FIGS. 7 to 9, an input gear 24 of an angular gear unit 25 which engages with an output gear 26 of the angular gear unit 25 is arranged at the end of the shaft 22 facing the roll-off piston 7".

A sensor body, not shown, is moveable along a circularly extending sensor track 15' by an output shaft 27 of the output gear 26.

A corresponding electric signal can be generated and fed to the plug pin of a contact plug socket 20 by the movement of the sensor body along the sensor track 15'.

The output gear 26 is acted upon by a compression spring 30 in a rotational direction so that the backlash between the input gear 24 and the output gear 26 is compensated, the force of the compression spring 30 being less than the force required for the rotational drive of the angular gear unit 25.

As is shown in FIGS. 7 and 8, the entire sensor device can be accommodated inside the roll-off piston 7". The housing of the roll-off piston 7" can be deformed radially outward in some places in order to create more installation space for the sensor device inside the roll-off piston 7". The roll-off piston which is deformed in this way then has a bulge 31 as is shown in FIGS. 7 and 8.

In the embodiment example of FIGS. 10 and 11, a permanent magnet 28, which forms a sensor body and which moves along a circularly extending sensor track, not shown, is arranged directly at the end of the shaft 22 facing the roll-off piston 7".

A corresponding electric signal can be generated by the movement of the permanent magnet 28 along the sensor track and can be fed to the plug pins of a contact plug socket 20".

As is shown in FIGS. 10 and 11, the permanent magnet 28 can be arranged coaxial to the longitudinal axis of shaft 22 and can rotate together with the shaft 22 around its longitudinal axis when the shaft 22 executes a rotational movement around its longitudinal axis because of the relative movement of the load receiver.

A sensor 32 can be arranged adjoining the contact plug socket 20'. The sensor 32 can be configured to sense the rotational angle of the permanent magnet 28 and at least indirectly generates a corresponding electric signal and routes it to the plug pins of a contact plug socket 20".

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An air spring for a motor vehicle comprising:
a load receiver;
a roll-off piston;
a rolling bellows filled with a gas under pressure, a first end of the rolling bellows being connected to the load receiver and a second end of the rolling bellows being fastened to the roll-off piston, wherein the load receiver and the roll-off piston are moveable relative to one another based at least in part on a force impinging on the load receiver toward the roll-off piston;
a sensor device arranged inside the rolling bellows by which a distance between the load receiver and the roll-off piston can be detected and a corresponding electric signal can be generated;
a sensor track of the sensor device;
a pressure piece extending in a direction of the roll-off piston arranged at the load receiver; and
a sensor body configured as a permanent magnet that is movably drivable directly or indirectly along the sensor track of the sensor device by an end region of the pressure piece facing the roll-off piston,
wherein the sensor device generates an electric signal corresponding to a position of the sensor body on the sensor track,
wherein the sensor track is arranged concentric to a rotational axis of a shaft on a sensor track support, and the sensor body is arranged at an end of the shaft remote of the pressure piece.

2. The air spring according to claim 1, wherein the sensor track is a linearly extending sensor track.

3. The air spring according to claim 1, wherein the sensor track is a circularly extending sensor track.

4. The air spring according to claim 3, wherein the pressure piece is fixed with respect to rotation and has at its end area facing the roll-off piston a lock with a lock aperture extending axially to the pressure piece, the shaft configured as an axially stationary shaft of a same cross section which is supported so as to be rotatable around the rotational axis and which has a helical thread extending over a length of the shaft projects into the lock aperture, wherein the sensor body is movably drivable along the circular sensor track from the end of the shaft remote of the pressure piece.

5. The air spring according to claim 1, wherein the sensor device is a contactless sensor device.

6. The air spring according to claim 1, wherein the sensor device is a magnetic inductive sensor device.

7. The air spring according to claim 6, wherein the sensor body has one or more LC circuits, and the sensor track has a first conductor path that extends along the sensor track in a sine-shaped manner and a second conductor path extends along the sensor track in a cosine-shaped manner.

8. The air spring according to claim 7, wherein the sensor body is movably drivable along a circular sensor track via a gear unit from an end of a shaft remote of the pressure piece.

9. The air spring according to claim 8, wherein the gear unit is an angular gear unit, and the sensor body is swivelable around a swiveling axis inclined at an angle to a rotational axis of the shaft.

10. The air spring according to claim 8, wherein the gear unit is a toothed-wheel transmission.

11. The air spring according to claim 10, wherein an output gear of the toothed-wheel transmission is acted upon in a rotational direction by a spring force which is smaller than the force required for a rotational drive of the toothed-wheel transmission.

12. The air spring according to claim 1, wherein the electric signal is configured to be fed to control electronics, wherein at least one of an inlet valve and an outlet valve to the interior of the rolling bellows can be controlled by the control electronics.

13. The air spring according to claim 12, wherein at least one of the control electronics, the inlet valve, and the outlet valve is arranged one of in the roll-off piston and at the roll-off piston.

14. The air spring according to claim 1, further comprising: a sensor arranged adjoining a contact plug socket, the sensor configured to sense a rotational angle of the permanent magnet and at least indirectly generate a corresponding electric signal and route the signal to plug pins of the contact plug socket.

15. A driver's cab bearing in a motor vehicle comprising:
an air spring for a motor vehicle comprising:
a load receiver;
a roll-off piston;
a rolling bellows filled with a gas under pressure, a first end of the rolling bellows being connected to the load receiver and a second end of the rolling bellows being fastened to the roll-off piston, wherein the load receiver and the roll-off piston are moveable relative to one another based at least in part on a force impinging on the load receiver toward the roll-off piston;
a sensor device arranged inside the rolling bellows by which a distance between the load receiver and the roll-off piston can be detected and a corresponding electric signal can be generated;
a sensor track of the sensor device;
a pressure piece extending in a direction of the roll-off piston arranged at the load receiver; and
a sensor body configured as a permanent magnet that is movably drivable directly or indirectly along the sensor track of the sensor device by an end region of the pressure piece facing the roll-off piston,
wherein the sensor device generates an electric signal corresponding to a position of the sensor body on the sensor track,
wherein the sensor track is arranged concentric to a rotational axis of a shaft on a sensor track support, and the sensor body is arranged at an end of the shaft remote of the pressure piece.

* * * * *